(12) United States Patent
Isambard

(10) Patent No.: US 12,548,882 B2
(45) Date of Patent: Feb. 10, 2026

(54) APPARATUS FOR ATTACHING A GIMBAL TO A STRUCTURE AND METHOD OF MANUFACTURING SUCH APPARATUS

(71) Applicant: Nokia Shanghai Bell Co., Ltd., Shanghai (CN)

(72) Inventor: Loic Isambard, Campbon (FR)

(73) Assignee: Nokia Shanghai Bell Co., Ltd., Shanghai (CN)

( * ) Notice: Subject to any disclaimer, the term of this patent is extended or adjusted under 35 U.S.C. 154(b) by 134 days.

(21) Appl. No.: 18/358,363

(22) Filed: Jul. 25, 2023

(65) Prior Publication Data

US 2024/0039139 A1 Feb. 1, 2024

(30) Foreign Application Priority Data

Jul. 26, 2022 (EP) ..................................... 22186822

(51) Int. Cl.
*H01Q 1/12* (2006.01)
(52) U.S. Cl.
CPC ................................... *H01Q 1/125* (2013.01)
(58) Field of Classification Search
CPC ............ H01Q 1/125; H01Q 1/12; F16C 11/04
See application file for complete search history.

(56) References Cited

U.S. PATENT DOCUMENTS

| | | | | |
|---|---|---|---|---|
| 6,407,713 B1* | 6/2002 | Mallenius | ............... | F16M 11/12 343/890 |
| 6,664,937 B2* | 12/2003 | Vermette | .............. | H01Q 1/1228 343/882 |
| 7,690,619 B2* | 4/2010 | Wolfersberger | ......... | H01Q 3/08 248/661 |
| 8,736,512 B2* | 5/2014 | Grice | ................... | H01Q 19/132 343/882 |
| 8,760,361 B2* | 6/2014 | Lewry | .................... | H01Q 1/125 343/912 |
| 8,866,695 B2* | 10/2014 | Renilson | ................ | H01Q 1/125 343/882 |
| 9,136,582 B2* | 9/2015 | Lewry | .................... | H01Q 1/125 |
| 9,966,649 B2* | 5/2018 | Christie | ................. | H01Q 1/125 |
| 10,096,885 B2* | 10/2018 | Renilson | ............... | F16B 5/0225 |

(Continued)

OTHER PUBLICATIONS

CommScope, "VHLP2-8018-DET, Base Product: VHLP2-8018, 0.6 m | 2 ft ValuLine® High Performance Low Profile Antenna, dual band, single polarised 71.000-86.000 GHz and single polarised 17.700-19.700 GHz, OEM custom flange", CommScope, 2023, https://www.commscope.com/product-type/antennas/microwave-antennas-accessories/point-to-point-ptp-microwave-antennas/itemvhlp2-8018-det/.

(Continued)

*Primary Examiner* — Monica E Millner
(74) *Attorney, Agent, or Firm* — Harness, Dickey & Pierce, P.L.C.

(57) ABSTRACT

An apparatus for attaching a gimbal for an antenna to a structure, the apparatus including a pivot element for attachment to the structure, wherein the pivot element includes a first hole for rotatably attaching the gimbal to the pivot element using a first fastening element, wherein the pivot element includes a second hole, which is an oblong hole, for guiding a rotational movement of the gimbal within an angular range around an axis of rotation associated with the first hole, wherein a first surface of the pivot element, which faces the gimbal, when the gimbal is attached to the pivot element, is convex.

16 Claims, 14 Drawing Sheets

(56) References Cited

U.S. PATENT DOCUMENTS

| | | | |
|---|---|---|---|
| 11,592,141 B2* | 2/2023 | Brandt | F16C 11/0685 |
| 11,631,929 B2* | 4/2023 | Isambard | H01Q 3/08 |
| | | | 343/890 |
| 11,674,636 B1* | 6/2023 | Li | F16M 11/2014 |
| | | | 248/231.61 |
| 12,095,138 B2* | 9/2024 | Kang | H01Q 3/08 |
| 2013/0221182 A1* | 8/2013 | Renilson | H01Q 1/125 |
| | | | 29/527.5 |
| 2014/0346294 A1* | 11/2014 | Lewry | H01Q 1/125 |
| | | | 248/201 |
| 2020/0119537 A1* | 4/2020 | Heath | H01Q 1/1242 |
| 2020/0321678 A1 | 10/2020 | Renilson et al. | |
| 2021/0336322 A1 | 10/2021 | Isambard et al. | |
| 2022/0255217 A1* | 8/2022 | Su | H01Q 1/125 |

OTHER PUBLICATIONS

Extended European Search Report, dated Jan. 5, 2023, issued in corresponding European Patent Application No. 22186822.7.

* cited by examiner

APPARATUS FOR ATTACHING A GIMBAL TO A STRUCTURE AND METHOD OF MANUFACTURING SUCH APPARATUS

CROSS-REFERENCE TO RELATED APPLICATIONS

This application claims priority to and the benefit of European Patent Application No. 22186822.7 filed on Jul. 26, 2022, the entire contents of each of which are incorporated herein by reference.

FIELD OF THE DISCLOSURE

Various example embodiments relate to an apparatus for attaching a gimbal, which is configured to receive an antenna, to a structure.

Further exemplary embodiments relate to a method of manufacturing an apparatus for attaching a gimbal, which is configured to receive an antenna, to a structure.

BACKGROUND

Antennas may be used for transmitting and/or receiving radio frequency signals, e.g. in a microwave frequency range and/or in other frequency ranges.

External forces, e.g. due to wind or vibrations of a structure carrying an antenna may affect a mounting or alignment of the antenna. Further, attaching devices to an antenna, such as e.g. active and/or passive devices for processing radio frequency signals associated with the antenna, may increase a wind load and/or a mass of the antenna. In some cases, an operation of a gimbal used e.g. for mounting an antenna to a structure may be affected by at least some of the abovementioned effects.

SUMMARY

Various embodiments of the disclosure are set out by the independent claims. The exemplary embodiments and features, if any, described in this specification, that do not fall under the scope of the independent claims, are to be interpreted as examples useful for understanding various exemplary embodiments of the disclosure.

Some exemplary embodiments relate to an apparatus for attaching a gimbal for an antenna to a structure, for example a mounting pole, the apparatus comprising a pivot element for attachment to the structure, e.g. using a mounting bracket or the like, wherein the pivot element comprises a first hole for rotatably attaching the gimbal to the pivot element using a first fastening element, wherein the pivot element comprises a second hole, which, for example, is an oblong hole, for guiding a rotational movement of the gimbal within a predetermined angular range around an axis of rotation associated with the first hole, wherein a first surface of the pivot element, which faces the gimbal, for example when the gimbal is attached to the pivot element, is convex. In some exemplary embodiments, this enables to address at least some aspects of conventional mounting systems, such as e.g. reducing and/or distributing mechanical stress, e.g. in the pivot element.

In some exemplary embodiments, the first surface of the pivot element comprises a first, for example at least substantially planar, surface section and a second, for example at least substantially planar, surface section. In some exemplary embodiments, at least one of the first surface section and the second surface section may e.g. be, for example completely, planar.

In some exemplary embodiments, the first surface section and the second surface section include a first angle, which is less than 180 degrees, wherein for example the first angle ranges between 150 degrees and 178 degrees.

In some exemplary embodiments, the first surface of the pivot element comprises a radius section between the first surface section and the second surface section.

In some exemplary embodiments, a center of the radius section is associated with the axis of rotation, wherein for example the center of the radius section is at least approximately the axis of rotation.

In some exemplary embodiments, the first surface of the pivot element is differentiable.

In some exemplary embodiments, the first surface of the pivot element is differentiable at least in a region around the first surface section and the second surface section, e.g. a region comprising at least parts of the first surface section and the second surface section.

In some exemplary embodiments, the second hole is arranged partly, for example circularly, around the first hole, wherein, for example, a center of a radius of the second hole is at least approximately the axis of rotation.

In some exemplary embodiments, the pivot element comprises a, for example basically, cylindrical shape, wherein the first surface of the pivot element forms a part of a cylindrical surface of the, for example basically, cylindrical shape.

In some exemplary embodiments, at least one of a top surface and a bottom surface of the cylindrical shape of the pivot element may e.g. make contact with at least one component of the gimbal, such as e.g. at least one mounting element of the gimbal for attachment to the pivot element, wherein e.g. forces (e.g., static and/or dynamic forces) resulting from a weight of an antenna attached and/or attachable to the gimbal and/or a wind load of the antenna may be introduced to the pivot element and/or to a structure the pivot element may be attached to.

In some exemplary embodiments, the pivot element comprises at least one opening, for example between the first hole and the second hole, e.g. for reducing a weight of the pivot element and/or of a mounting system comprising the pivot element.

In some exemplary embodiments, the pivot element comprises a third hole for attaching a component of an adjustment mechanism that is configured to adjust a relative rotation between the pivot element and the gimbal.

In some exemplary embodiments, the apparatus comprises at least one of: a) the first fastening element, e.g. a bolt, e.g. threaded bolt or screw (e.g., for connecting, e.g. rotatably attaching, the gimbal to the pivot element through the first hole, as already mentioned above), b) a second fastening element, e.g. a bolt, e.g. threaded bolt or screw, for connecting the gimbal to the pivot element through the second hole.

Further exemplary embodiments relate to a mounting system for attaching an antenna to a structure, for example a mounting pole, the mounting system comprising an apparatus according to the embodiments and a gimbal rotatably attachable and/or rotatably attached to the pivot element of the apparatus.

In some exemplary embodiments, the gimbal comprises at least a first mounting element comprising a first hole and a second hole for attachment to the pivot element, wherein a width of the first mounting element is equal to or smaller than a sum of a length of the first surface section of the pivot element and a length of the second surface section of the pivot element.

Further exemplary embodiments relate to an antenna comprising at least one of: a) an apparatus according to the embodiments, b) a mounting system according to the embodiments.

Further exemplary embodiments relate to a method of manufacturing an apparatus for attaching a gimbal, which is configured to receive an antenna, to a structure, the method comprising providing a pivot element for attachment to the structure, wherein the pivot element comprises a first hole for rotatably attaching the gimbal to the pivot element using a first fastening element, wherein the pivot element comprises a second hole, which is an oblong hole, for guiding a rotational movement of the gimbal within a predetermined angular range around an axis of rotation associated with the first hole, wherein a first surface of the pivot element, which faces the gimbal, for example when the gimbal is attached to the pivot element, is convex. In some exemplary embodiments, the apparatus may be used for rotatably attaching an antenna to a structure.

DESCRIPTION OF SOME EXEMPLARY EMBODIMENTS

Figure 1:
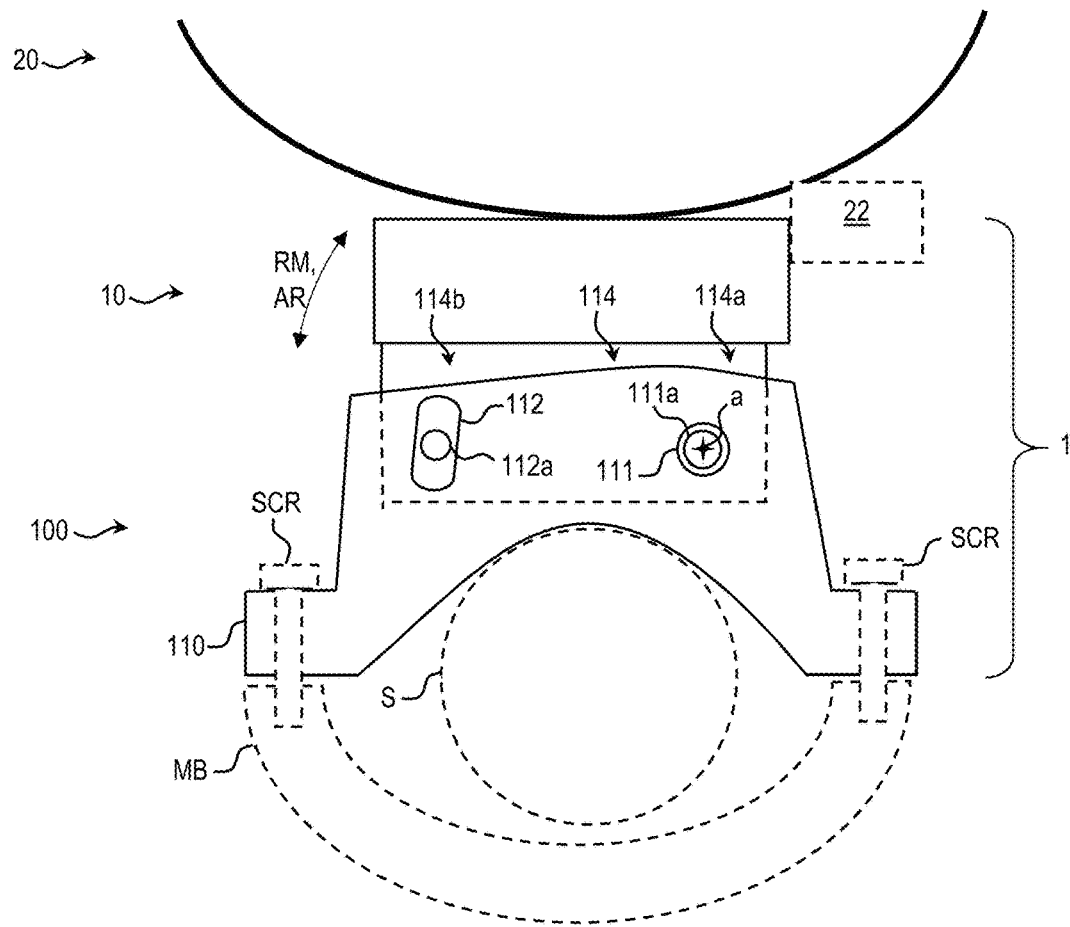
FIG. 1 schematically depicts a simplified top view according to some exemplary embodiments, FIG. 2 schematically depicts a simplified top view of details of a pivot element according to some exemplary embodiments, FIG. 3 schematically depicts a simplified perspective view according to some exemplary embodiments, FIG. 4 schematically depicts a simplified top view according to some exemplary embodiments, FIG. 5 schematically depicts a simplified cross-sectional view according to some exemplary embodiments, FIG. 6 schematically depicts a simplified perspective view according to some exemplary embodiments, FIG. 7 schematically depicts a simplified perspective view according to some exemplary embodiments, FIG. 8 schematically depicts a simplified perspective view according to some exemplary embodiments, FIG. 9 schematically depicts a simplified perspective view according to some exemplary embodiments, FIG. 10A schematically depicts a simplified top view of a gimbal attached to a pivot element in a first rotational state according to some exemplary embodiments, FIG. 10B schematically depicts a distribution of mechanical stress of the pivot element of FIG. 10B, FIG. 10C schematically depicts a color version of FIG. 10B, FIG. 11A schematically depicts a simplified top view of a gimbal attached to a pivot element in a second rotational state according to some exemplary embodiments, FIG. 11B schematically depicts a distribution of mechanical stress of the pivot element of FIG. 11A, FIG. 11C schematically depicts a color version of FIG. 11B, FIG. 12A schematically depicts a simplified top view of a gimbal attached to a pivot element in a third rotational state according to some exemplary embodiments, FIG. 12B schematically depicts a distribution of mechanical stress of the pivot element of FIG. 12A, FIG. 12C schematically depicts a color version of FIG. 12B, FIG. 13A schematically depicts a simplified perspective view of aspects according to some exemplary embodiments, FIG. 13B schematically depicts a simplified perspective view of aspects according to some exemplary embodiments, FIG. 14 schematically depicts a simplified perspective view of aspects according to some exemplary embodiments, FIG. 15 schematically depicts a simplified top view of aspects according to some exemplary embodiments, FIG. 16A schematically depicts a simplified perspective view of aspects according to some exemplary embodiments, FIG. 16B schematically depicts a simplified top view of aspects according to some exemplary embodiments, FIG. 17A schematically depicts a simplified perspective view of aspects according to some exemplary embodiments, FIG. 17B schematically depicts a simplified top view of aspects according to some exemplary embodiments, and FIG. 18 schematically depicts a simplified flow chart according to some exemplary embodiments.

Some exemplary embodiments, see for example FIG. 1, relate to an apparatus 100 for attaching a gimbal 10 for an antenna 20 to a structure S, for example a mounting pole, the apparatus 100 comprising a pivot element 110 for attachment to the structure S, e.g. using a mounting bracket MB, which in some exemplary embodiments can e.g. be connected to the pivot element 110 using one or more screws SCR.

The pivot element 110 comprises a first hole 111 for rotatably attaching the gimbal 10 to the pivot element 110 using a first fastening element (e.g., a threaded bolt or screw) 111a. The pivot element 110 also comprises a second hole 112, which is, for example, an oblong hole, for guiding a rotational movement RM of the gimbal (e.g., together with the antenna 20 attached to the gimbal 10) within a predetermined angular range AR around an axis a of rotation associated with, e.g. defined by, the first hole 111.

This way, in some exemplary embodiments, a mounting system 1 may be provided which e.g. enables to adjust a rotational orientation of the antenna 20 and the gimbal 10 with respect to the pivot element 110 or the structure S, respectively, e.g. along an azimuth dimension.

In some exemplary embodiments, the antenna 20 may be a microwave antenna, e.g. being configured to transmit and/or receive radio frequency signals of a microwave frequency range. In some exemplary embodiments, the antenna 20 may be configured for one or more frequency ranges other than a microwave frequency range.

In some exemplary embodiments, the antenna 20 may be configured to transmit and/or receive radio frequency signals associated with different polarizations, e.g. horizontal polarization and vertical polarization.

In some exemplary embodiments, one or more radio devices 22 may be attached to the antenna 20 or, e.g. together with the antenna 20, to the gimbal 10. In some exemplary embodiments, the radio devices 22 may e.g. comprise at least one orthomode-transducer (OMT) and/or at least one so-called outdoor unit (ODU). In some exemplary embodiments, the outdoor units are configured to process radio frequency signals to be transmitted and/or received by the antenna 20, wherein a specific outdoor unit may e.g. be associated with a specific polarization.

In some exemplary embodiments, FIG. 1, a first surface 114 of the pivot element 110, which faces the gimbal 10, for example when the gimbal 10 is attached to the pivot element 110, is convex. In some exemplary embodiments, this enables to address at least some aspects of conventional mounting systems, such as e.g. reducing and/or distributing mechanical stress, e.g. in the pivot element, which, in some exemplary embodiments, may e.g. reduce a wear of the components 10, 110, which may e.g. occur when rotating the gimbal 10, loaded with the antenna 20, relative to the pivot element 110.

In some exemplary embodiments, FIG. 1, the first surface 114 of the pivot element 110 comprises a first, for example at least substantially planar, surface section 114a and a second, for example at least substantially planar, surface section 114b. In some exemplary embodiments, at least one of the first surface section 114a and the second surface section 114b may e.g. be, for example completely, planar.

Figure 2:
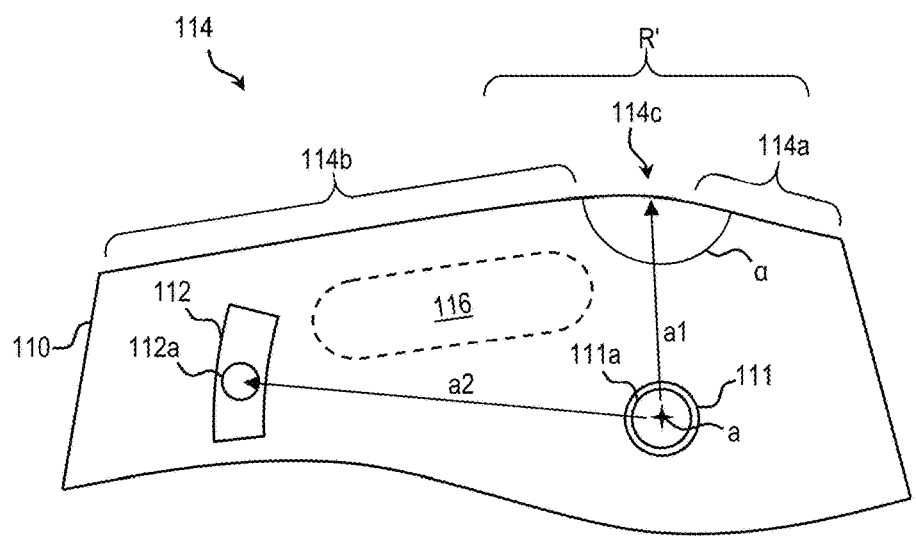

In some exemplary embodiments, see for example the detail view of FIG. 2, the first surface section 114a and the second surface section 114b include a first angle $\alpha$, which is less than 180 degrees, wherein for example the first angle $\alpha$ ranges between, for example about, 150 degrees and, for example about, 178 degrees.

In some exemplary embodiments, FIG. 2, the first surface 114 of the pivot element 110 comprises a radius section 114c between (e.g., in FIG. 2 horizontally between) the first surface section 114a and the second surface section 114b.

In some exemplary embodiments, a center of the radius section 114c, see also arrow a1, is associated with the axis a of rotation, wherein for example the center of the radius section 114c is at least approximately the axis a of rotation.

In some exemplary embodiments, FIG. 2, the first surface 114 of the pivot element 110 is differentiable, which, in some exemplary embodiments, enables a particularly smooth distribution of forces and/or mechanical stress applied to the pivot element 110, e.g. by the gimbal 10 loaded with the antenna 20.

In some exemplary embodiments, FIG. 2, the first surface 114 of the pivot element 110 is differentiable at least in a region R' around the first surface section 114a and the second surface section 114b, e.g. a region R' comprising at least parts of the first surface section 114a and the second surface section 114b.

In some exemplary embodiments, FIG. 2, the second hole 112 is arranged partly, for example circularly, around the first hole 111, wherein, for example, a center of a radius a2 of the second hole 112 is at least approximately the axis a of rotation.

Figure 3:
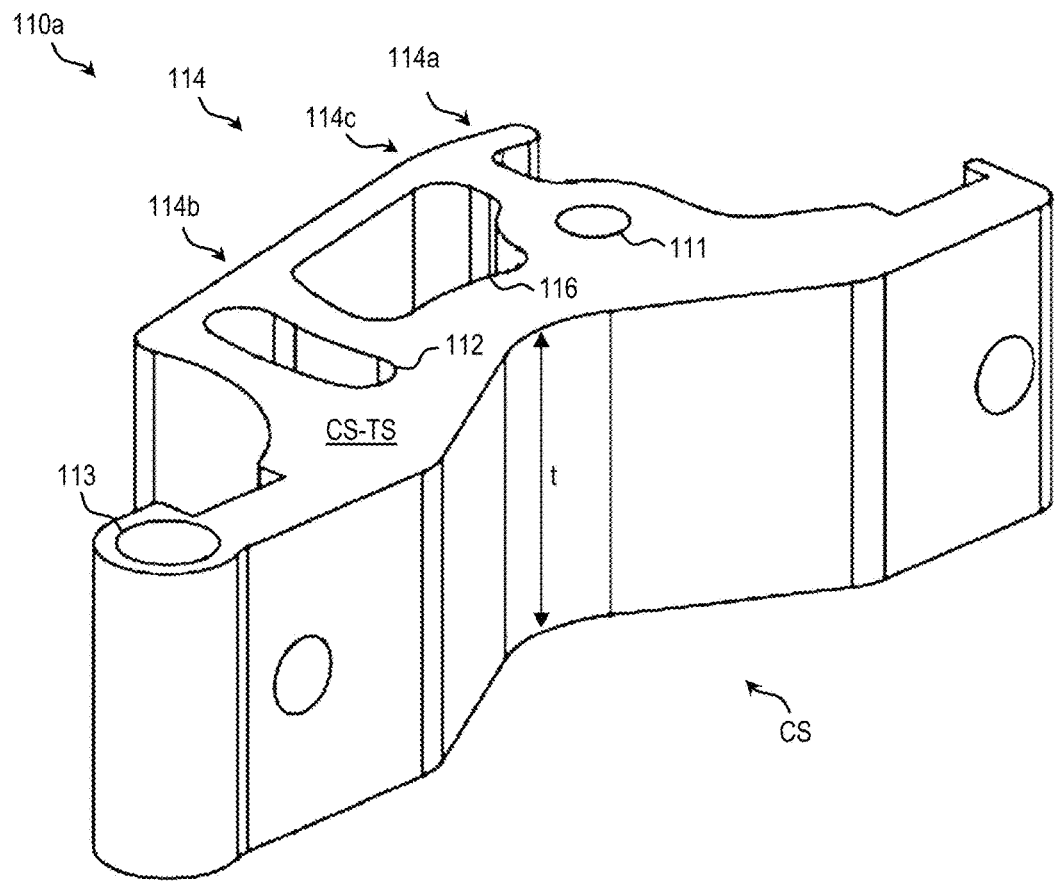

In some exemplary embodiments, FIG. 3, the pivot element 110a comprises a, for example basically, cylindrical shape CS, wherein the first surface 114 of the pivot element 110a forms a part of a cylindrical surface of the, for example basically, cylindrical shape CS.

In some exemplary embodiments, FIG. 3, at least one of a top surface CS-TS and a bottom surface (not shown) of the cylindrical shape CS of the pivot element 110a may e.g. make contact with at least one component of the gimbal 10, such as e.g. at least one mounting element 12a, 12b (see FIG. 6, 7 explained further below) of the gimbal 10, for attachment to the pivot element 110a (FIG. 3), wherein e.g. forces (e.g., static and/or dynamic forces) resulting from a weight of an antenna 20 (FIG. 1) attached and/or attachable to the gimbal 10 and/or a wind load of the antenna 20 may be introduced to the pivot element 110a and/or to a structure S (FIG. 1) the pivot element 110a may be attached to. A thickness of the pivot element 110a according to some exemplary embodiments is symbolized in FIG. 3 by reference sign t.

In some exemplary embodiments, see, for example, FIG. 2, 3, 4, the pivot element 110, 110a comprises at least one opening 116, for example between the first hole 111 and the second hole 112, e.g. for reducing a weight of the pivot element 110, 110a and/or of a mounting system 1 comprising the pivot element 110, 110a.

In some exemplary embodiments, FIG. 3, the pivot element 110a comprises a third hole 113 for attaching a component (not shown in FIG. 3, see, for example, FIG. 14) of an adjustment mechanism that is configured to adjust a relative rotation between the pivot element 110a and the gimbal 10, e.g. for enabling azimuth adjustment of an antenna 20 (FIG. 1) attached to the pivot element 110a.

In some exemplary embodiments, FIG. 1, 2, the apparatus 100 comprises at least one of: a) the first fastening element, e.g. a bolt, e.g. threaded bolt or screw 111a (e.g., for connecting, e.g. rotatably attaching, the gimbal 10 to the pivot element 110, 110a through the first hole 111, as already mentioned above), b) a second fastening element 112a, e.g. a bolt, e.g. threaded bolt or screw, for connecting the gimbal 10 to the pivot element 110, 110a through the second hole 112.

Further exemplary embodiments, FIG. 1, relate to a mounting system 1 for attaching an antenna 20 to a structure S, for example a mounting pole, the mounting system 1 comprising an apparatus 100 according to the embodiments and a gimbal 10 rotatably attachable and/or rotatably attached to the pivot element 110 of the apparatus 100.

Figure 4:
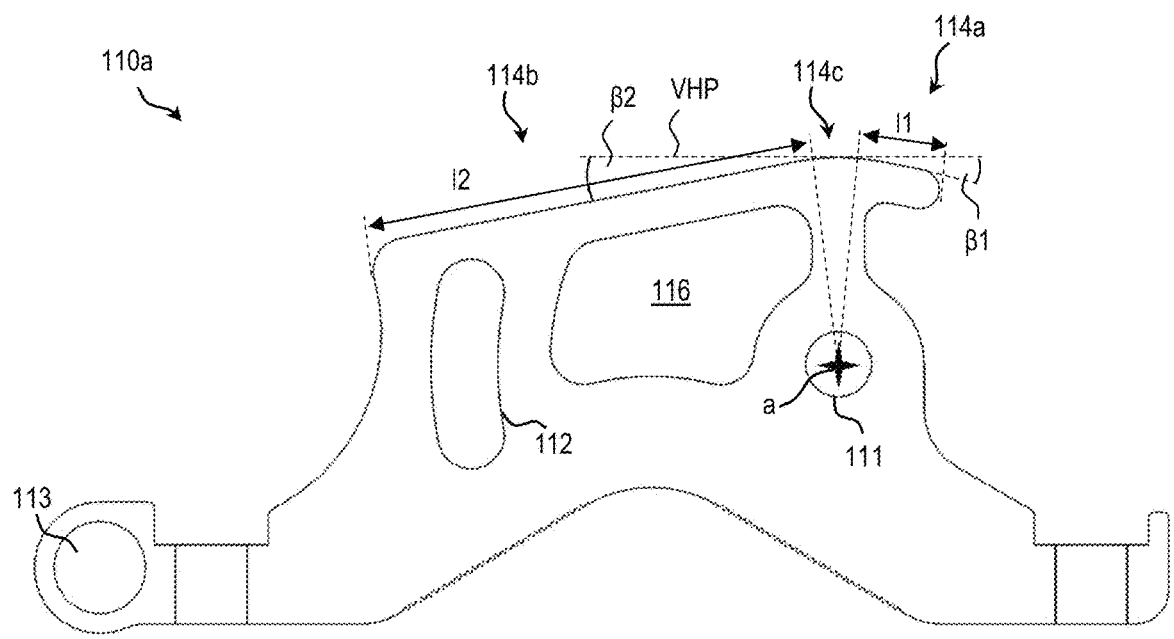

FIG. 4 schematically depicts a simplified top view according to some exemplary embodiments. In some exemplary embodiments, the first surface section 114a of the pivot element 110a may comprise a first length 11.

In some exemplary embodiments, FIG. 4, the second surface section 114b of the pivot element 110a may comprise a second length 12, which is e.g. different from the first length 11. In some exemplary embodiments, the second length 12 is greater than the first length 11.

In some exemplary embodiments, FIG. 4, the first angle $\alpha$ (FIG. 2) is chosen such that the first surface section 114a of the pivot element 110a includes an angle $\beta 1$ with a virtual horizontal plane VHP of FIG. 4.

In some exemplary embodiments, FIG. 4, the first angle $\alpha$ (FIG. 2) is chosen such that the second surface section 114b of the pivot element 110a includes an angle $\beta 2$ with the virtual horizontal plane VHP of FIG. 4.

In some exemplary embodiments, the angles $\beta 1$, $\beta 2$ may not be equal.

In some exemplary embodiments, the angles $\beta 1$, $\beta 2$ may be equal.

In some exemplary embodiments, at least one of the angles $\beta 1$, $\beta 2$ may, for example, range between 0 degrees and 20 degrees.

In some exemplary embodiments, angle $\beta 1$ may be 11 degrees, and angle $\beta 2$ may be 11 degrees. In some exemplary embodiments, a sum $\beta 1+\beta 2$ may characterize the angular range AR (FIG. 1) the gimbal 10 may be rotated relative to the pivot element 110, 110a.

Figure 5:
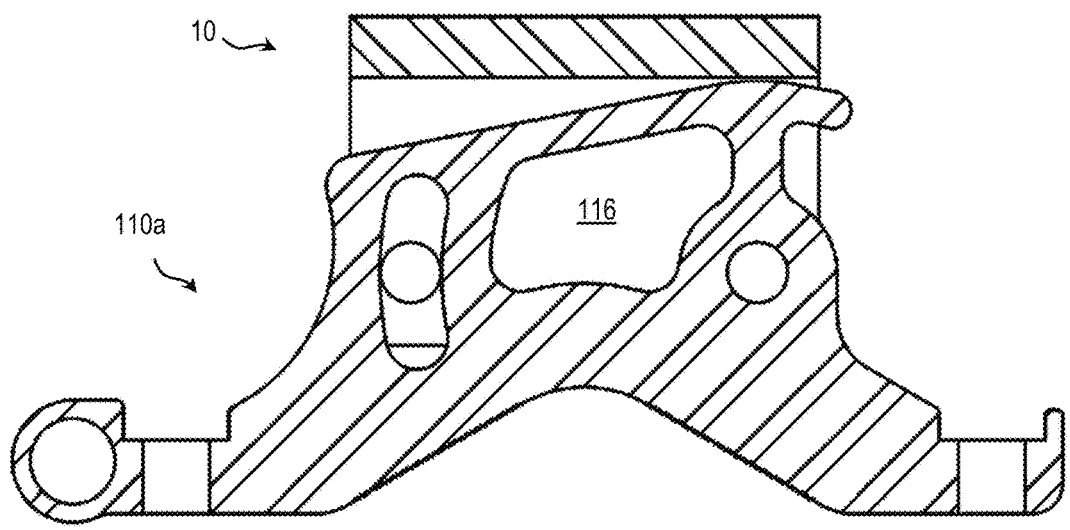

FIG. 5 schematically depicts a simplified cross-sectional view of the gimbal 10 attached to the pivot element 110a according to some exemplary embodiments.

Figure 6:
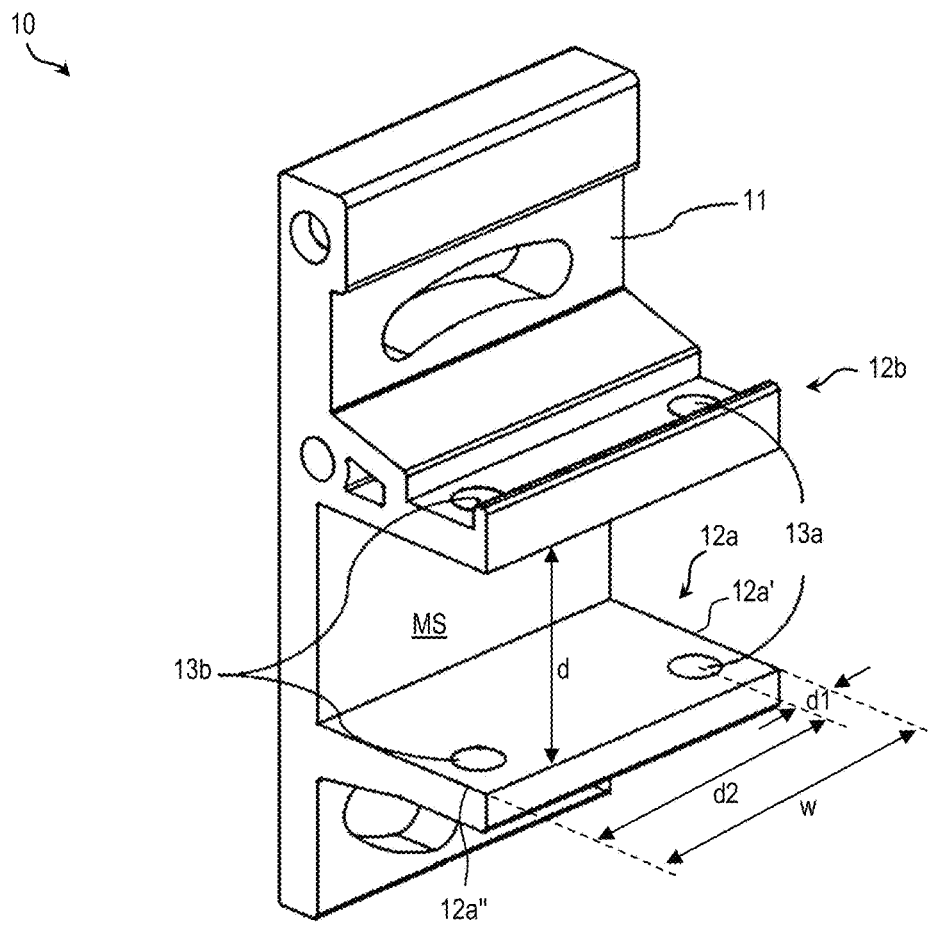

In some exemplary embodiments, FIG. 6, the gimbal 10 comprises at least a first mounting element 12a comprising a first hole 13a and a second hole 13b for attachment to the pivot element 110a (FIG. 4), wherein, in some exemplary embodiments, a width w (FIG. 6) of the first mounting element 12a between respective edges 12a', 12a" is equal to or smaller than a sum of a length 11 of the first surface section 114a of the pivot element 110a and a length 12 of the second surface section 114b of the pivot element 110a.

In some exemplary embodiments, FIG. 6, a distance d1 of a center of the hole 13a of the first mounting element 12a to an adjacent edge 12a' of the first mounting element 12a is equal to or less than the length l1 of the first surface section 114a (FIG. 4).

In some exemplary embodiments, FIG. 6, a distance d2 of a center of the hole 13b to the center of the hole 13a of the first mounting element 12a is equal to or less than the length l2 of the second surface section 114b (FIG. 4).

In some exemplary embodiments, FIG. 6, the gimbal 10 comprises at least one further, e.g. a second, mounting element 12b, which may, for example, also comprise respective holes 13a, 13b for attachment to the pivot element 110a.

In some exemplary embodiments, the two mounting elements 12a, 12b, which may e.g. be arranged on a common base 11, define a mounting section MS there between, which is configured to receive a portion of the pivot element 110, 110a (FIG. 4) comprising, inter alia, the first surface 114. In some exemplary embodiments, the antenna 20 (FIG. 1) and/or one or more devices such as e.g. radio equipment (not shown) may be attached to the base 11.

In some exemplary embodiments, a vertical distance d between the two mounting elements 12a, 12b of the gimbal 10 may be chosen depending on the thickness t (FIG. 3) of the pivot element 110a (or vice versa), e.g. d=t+ε, wherein ε characterizes a non-vanishing parameter, which, for example, characterizes how tight the pivot element 110a is embedded within the mounting section MS of the gimbal 10.

In some exemplary embodiments, the parameter s may be chosen such that the gimbal 10 may be rotated comparatively easily (e.g., apart from friction forces due to the antenna load) with respect to the pivot element 110a, e.g. if the screws 111, 111a, 112a are not (e.g., substantially) tightened.

Figure 7:
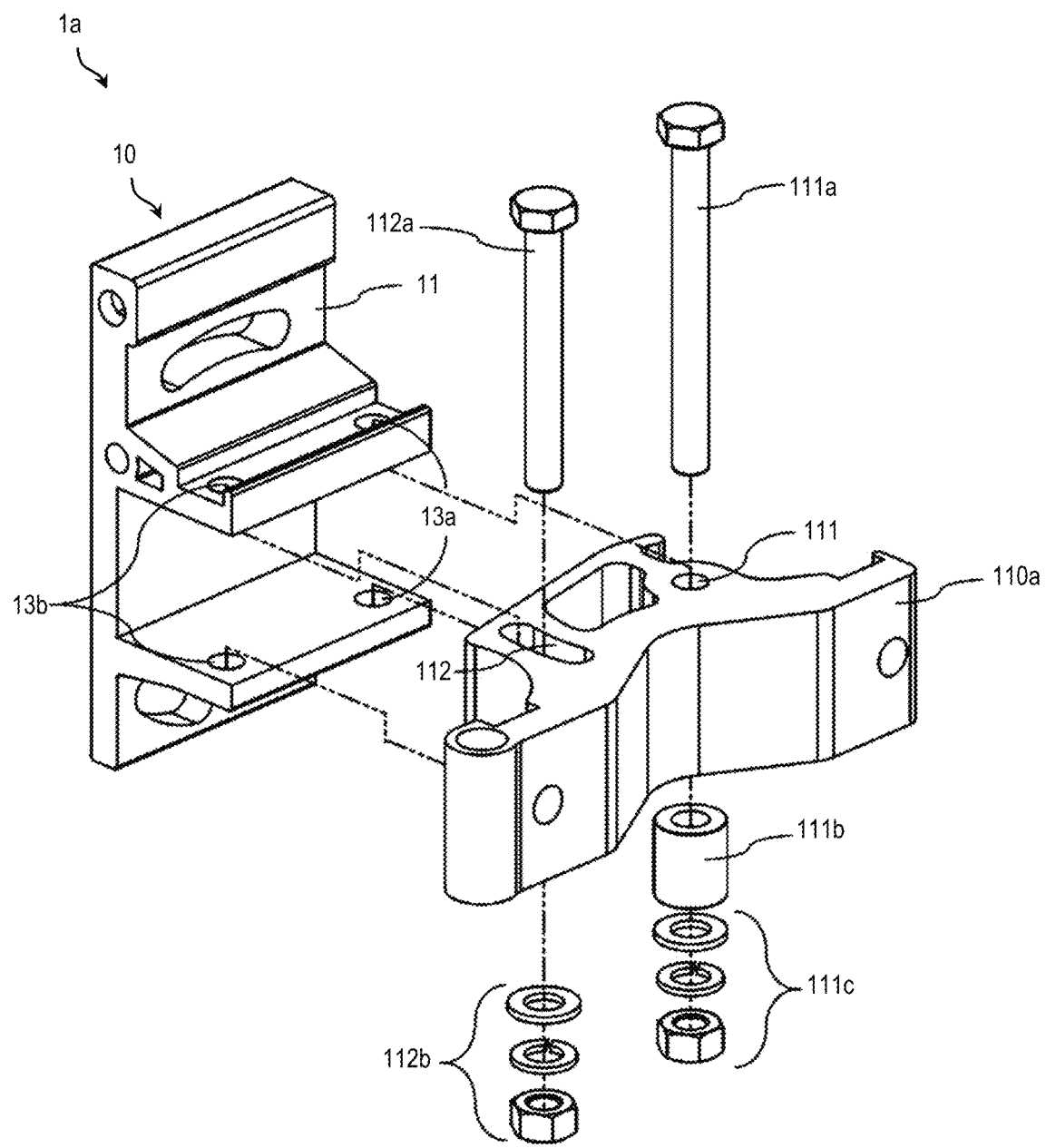

FIG. 7 schematically depicts a simplified perspective view of a mounting system 1a according to some exemplary embodiments. In some exemplary embodiments, the pivot element 110a is assembled with the gimbal 10 as schematically depicted by FIG. 7. In some exemplary embodiments, the circular holes 13a of the gimbal 10 are aligned with the, preferably also circular, hole 111, and the circular holes 13b are aligned with the oblong hole 112. In some exemplary embodiments, the screw 111a is inserted through the holes 13a and 111, and the screw 112a is inserted through the holes 13b and 112. In some exemplary embodiments, a spacer 111b is provided for the screw 111a, and one or more washers and a nut, which are collectively denoted with reference sign 111c. In some exemplary embodiments, the spacer 111b may be used to ease an access to the nut 111c, e.g. with a wrench. In some exemplary embodiments, the screw 112a is fastened with one or more washers and a nut collectively denoted with reference sign 112b in FIG. 7.

Figure 8:
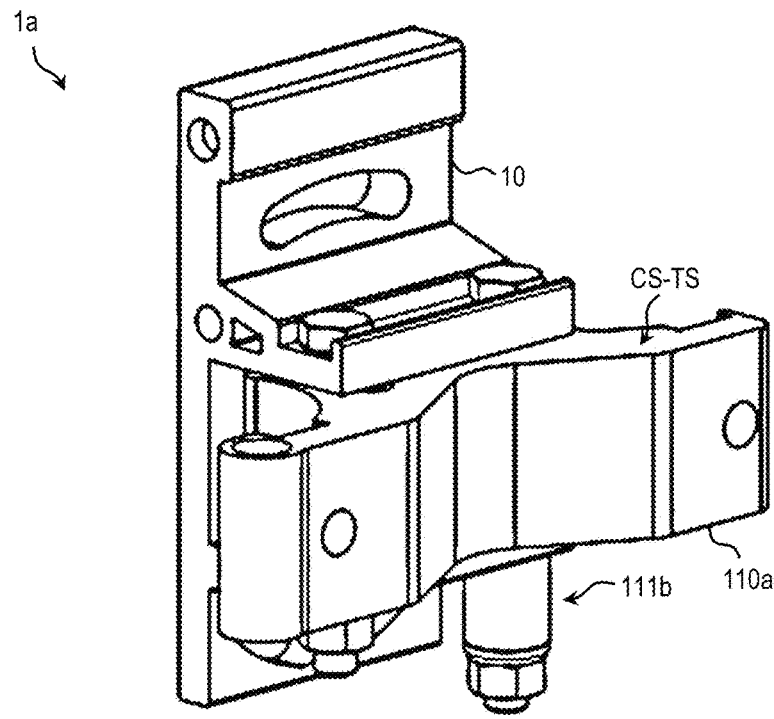
Figure 9:
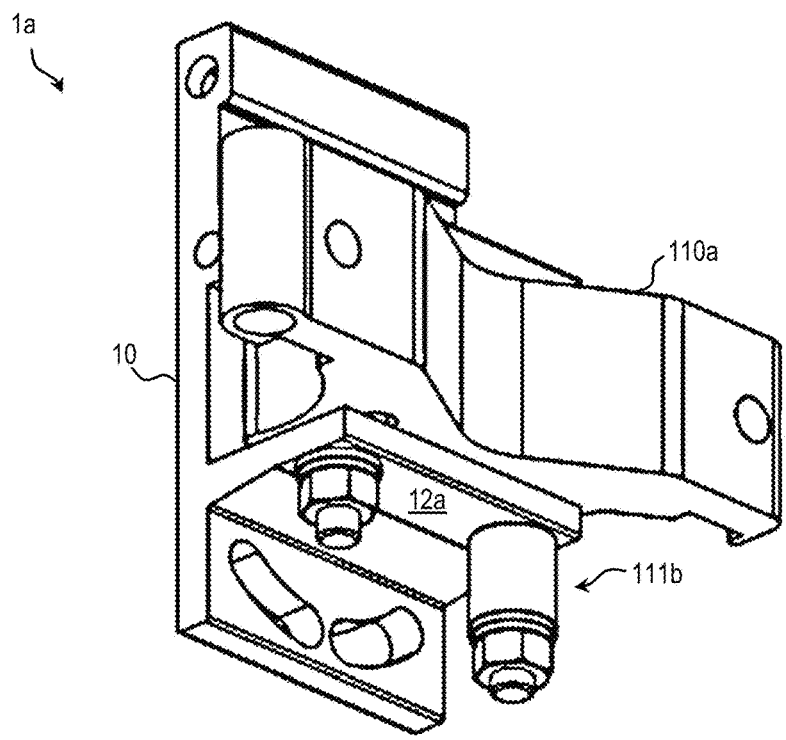

FIG. 8, 9 schematically depict simplified perspective views of the assembled mounting system 1a of FIG. 7 according to some exemplary embodiments.

Figure 10A:
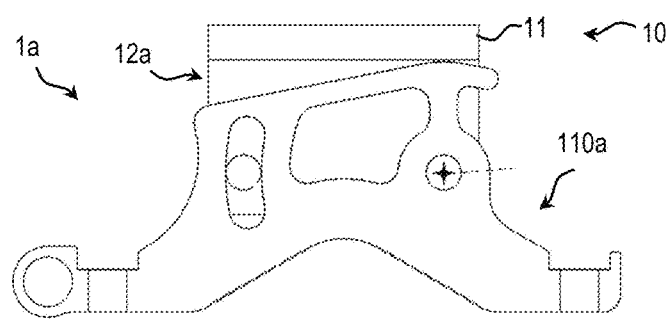
Figure 10B:
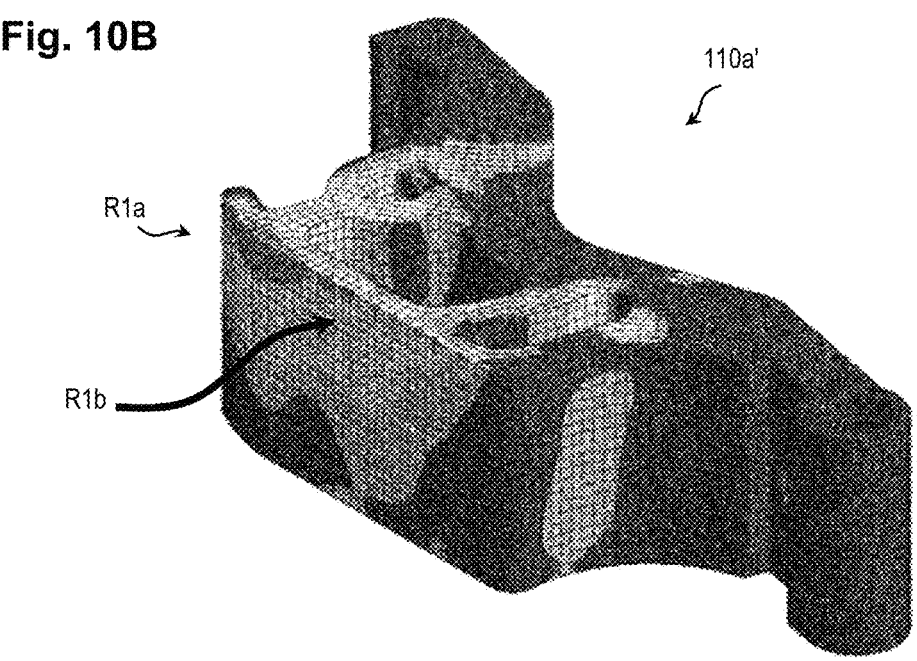
Figure 10C:
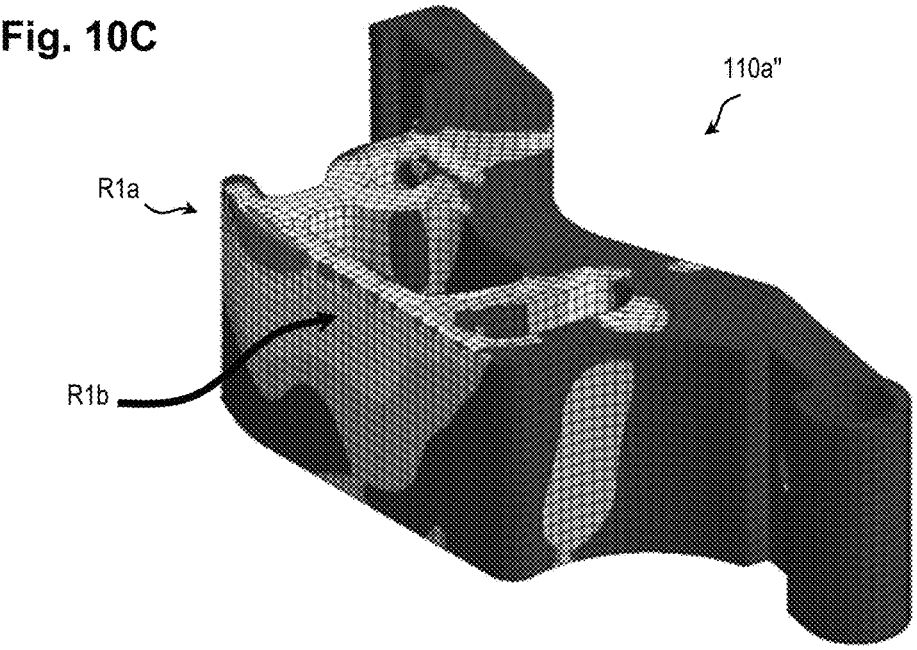

FIG. 10A schematically depicts a simplified top view the mounting system 1a according to some exemplary embodiments in a first rotational state, presently for example a neutral state with an azimuth setting of 0 degrees. Note that only some sections 11, 12a of the gimbal 10 (also cf. FIG. 7) are schematically depicted for the sake of clarity. For example, the second mounting element 12b is not depicted by FIG. 10A, and neither depicted is an antenna 20 with radio equipment 22 (see FIG. 1) representing a load of the gimbal 10 the associated forces of which are introduced via the gimbal 10 into the pivot element 110a when attaching the gimbal 10 with its load components 20, 22 to the pivot element 110a. FIG. 10B schematically depicts a distribution of mechanical stress of the pivot element 110a of FIG. 10A obtained by a numerical simulation under such load condition, see reference sign 110a' of FIG. 10B, and FIG. 100 schematically depicts a color version 110a" of the depiction of FIG. 10B.

From FIG. 10B, 100, it can be seen that mechanical stress in the pivot element 110a due to the load 10, 20, 22 concentrates in region R1a, but is also distributed to some extent in region R1b, due to the convex configuration of the first surface 114, and, in some exemplary embodiments, due to a, for example straight, edge in region R1b, which is associated with the second surface section 114b, see also FIG. 4.

Figure 11A:
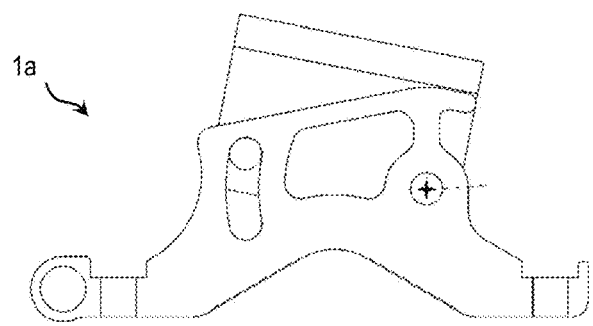
Figure 11B:
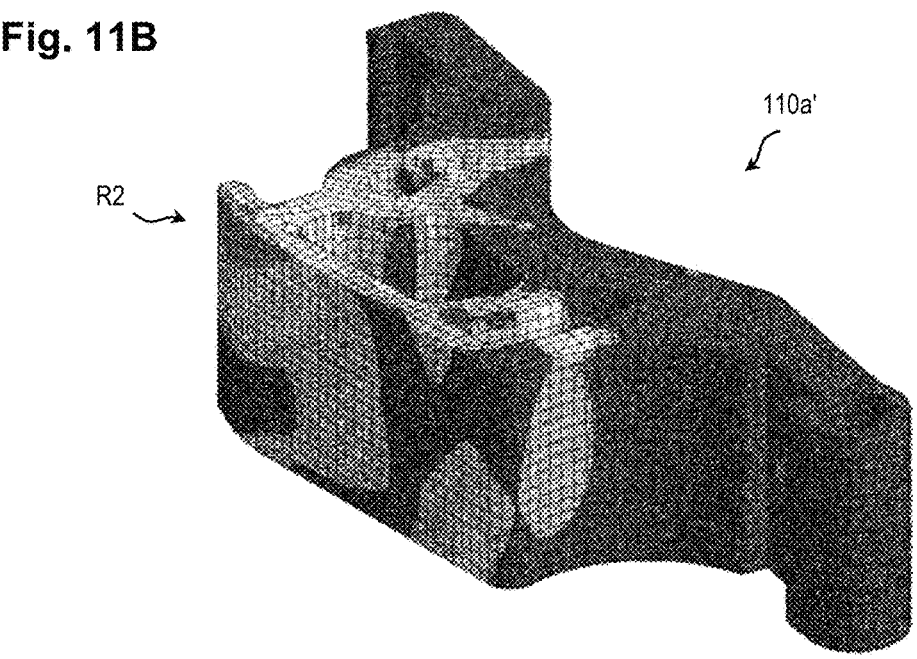

FIG. 11A schematically depicts a simplified top view the mounting system 1a according to some exemplary embodiments in a second rotational state, presently for example a state with an azimuth setting of +11 degrees, wherein the same load conditions as exemplarily mentioned above for FIG. 10B, 100 are assumed. FIG. 11B schematically depicts a distribution of mechanical stress of the pivot element 110a of FIG. 11A obtained by a numerical simulation, see reference sign 110a' of FIG. 11B, and FIG. 11C schematically depicts a color version 110a" of the depiction of FIG. 11B.

Figure 11C:
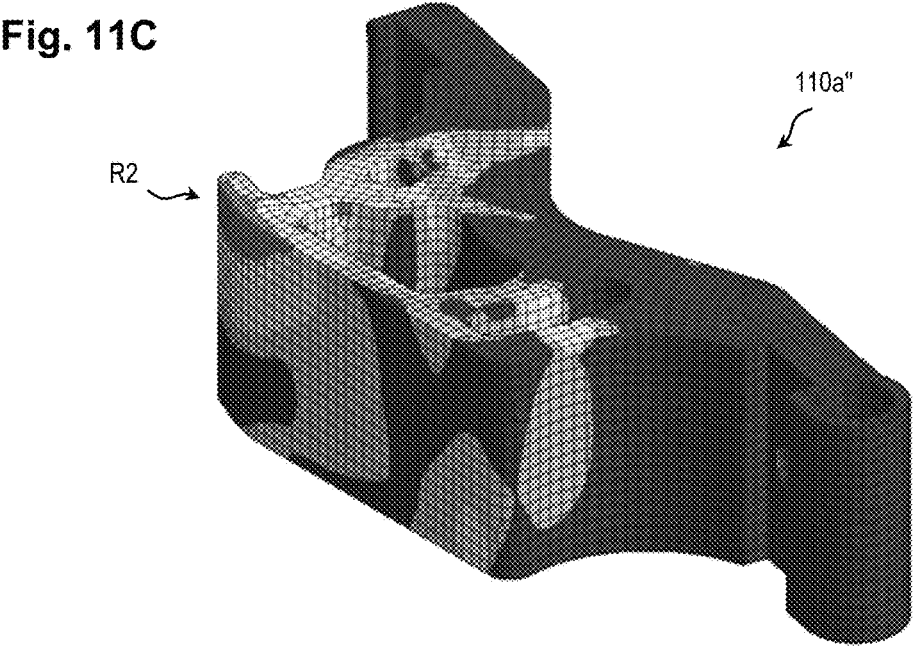

From FIG. 11B, 11C, it can be seen that mechanical stress in the pivot element 110a due to the load with components 10, 20, 22 concentrates primarily in region R2. It can also be seen that the radius section 114c (FIG. 4) contributes to distributing the mechanical stress along the first surface section 114a and a beginning of the second surface section 114b, i.e. at least at a portion of the second surface section 114b adjacent to the radius section 114c.

Figure 12A:
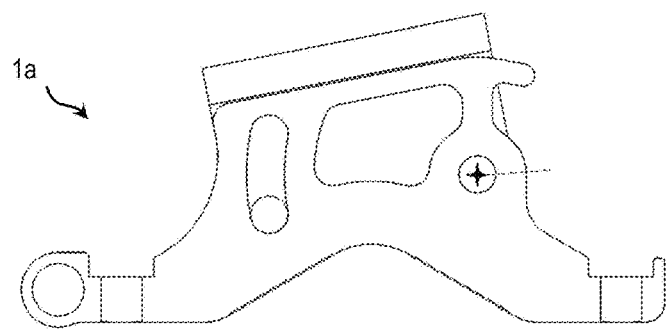
Figure 12B:
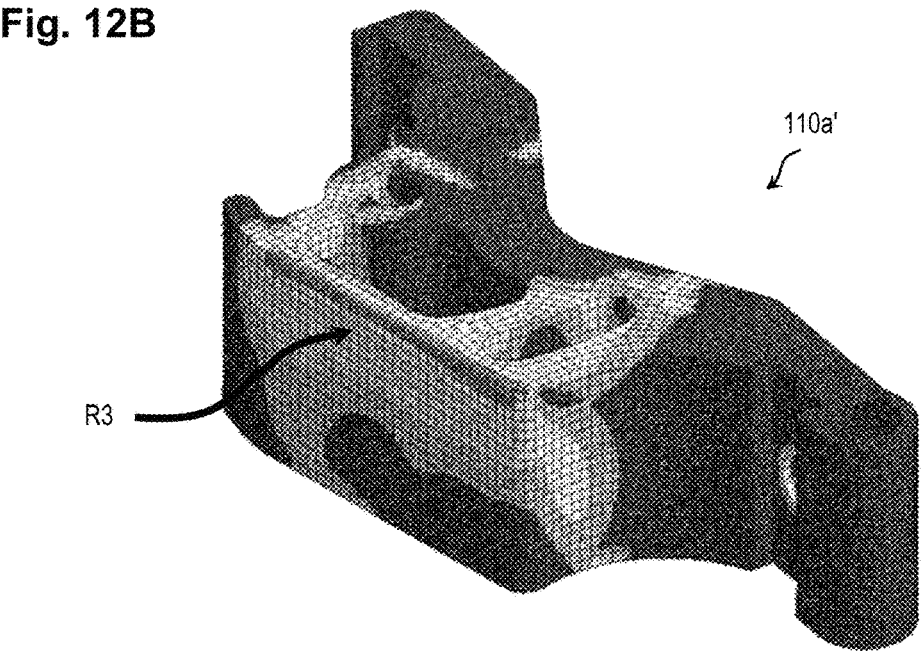

FIG. 12A schematically depicts a simplified top view the mounting system 1a according to some exemplary embodiments in a third rotational state, presently for example a state with an azimuth setting of −11 degrees, wherein the same load conditions as exemplarily mentioned above for FIG. 10A, 10B, 100 are assumed. FIG. 12B schematically depicts a distribution of mechanical stress of the pivot element 110a of FIG. 12A obtained by a numerical simulation, see reference sign 110a' of FIG. 12B, and FIG. 12C schematically depicts a color version 110a" of the depiction of FIG. 12B.

Figure 12C:
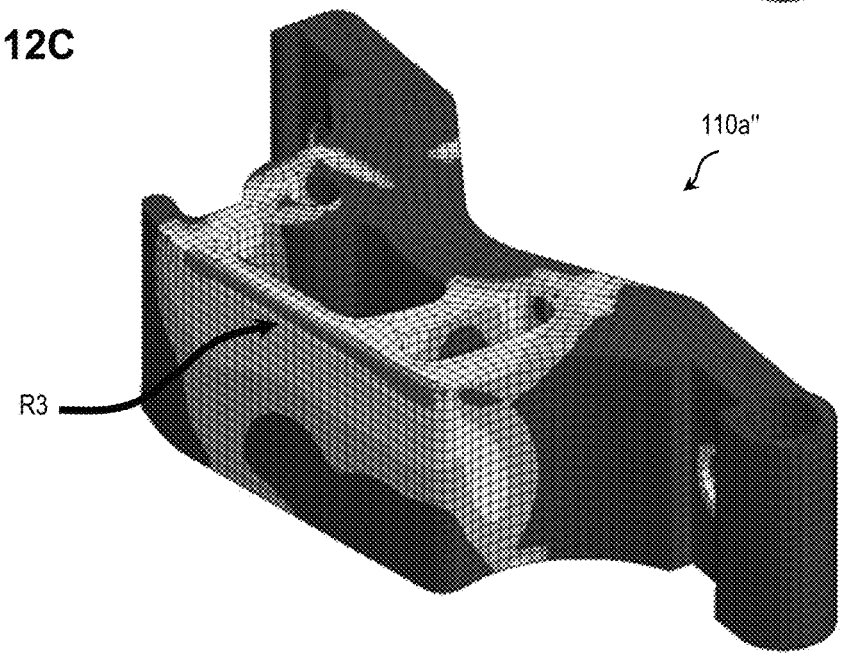

From FIG. 12B, 12C, it can be seen that mechanical stress in the pivot element 110a due to the load with components 10, 20, 22 is substantially evenly distributed in region R3, i.e. along the second surface section 114b (FIG. 4), e.g. all along the second surface section 114b.

In some exemplary embodiments, as soon as the configuration 10, 110a will be rotated towards a positive azimuth direction, e.g. starting from the state depicted by FIG. 12A, the mechanical stress of the pivot element 110a will be shifted to the regions explained above with reference to FIG. 10A to 11C.

Figure 13B:
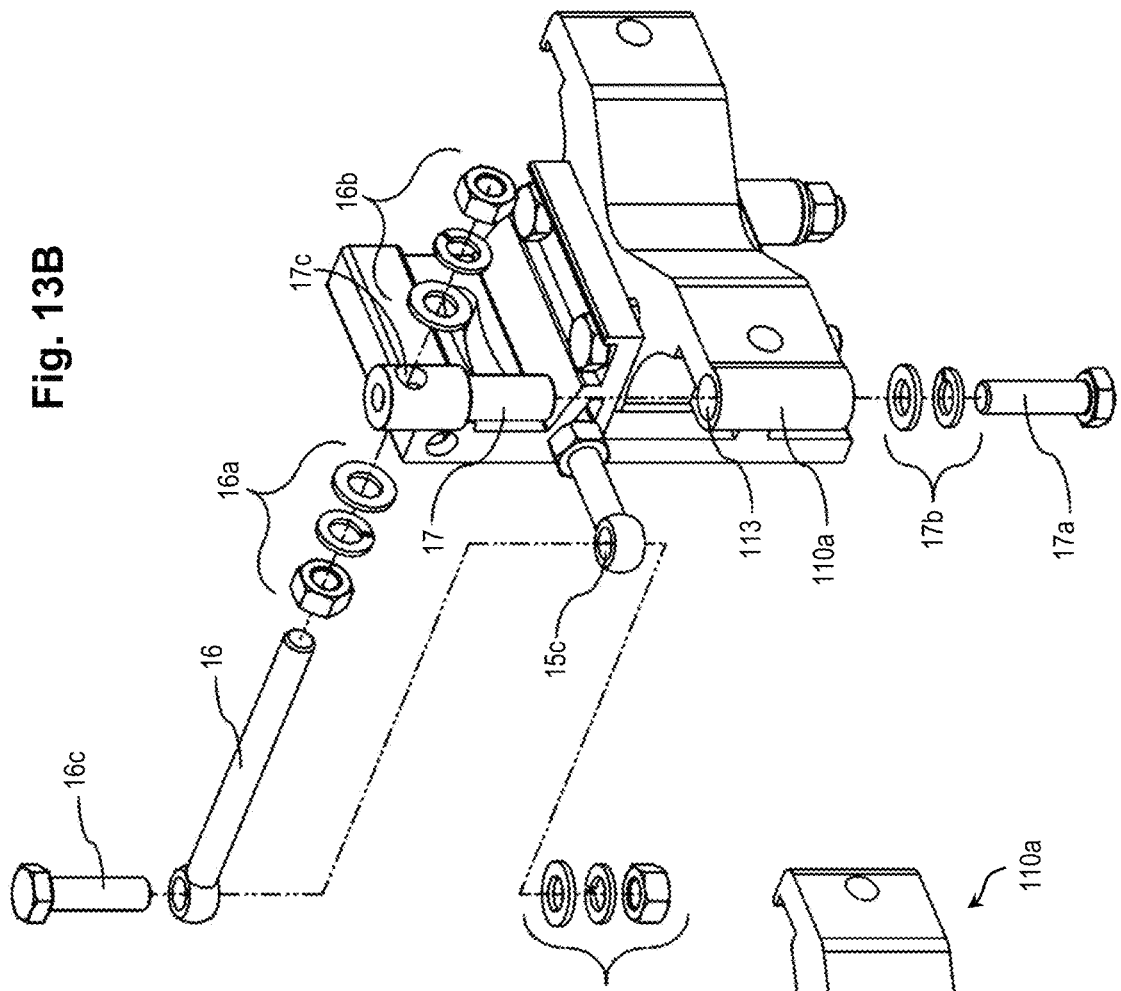
Figure 13A:
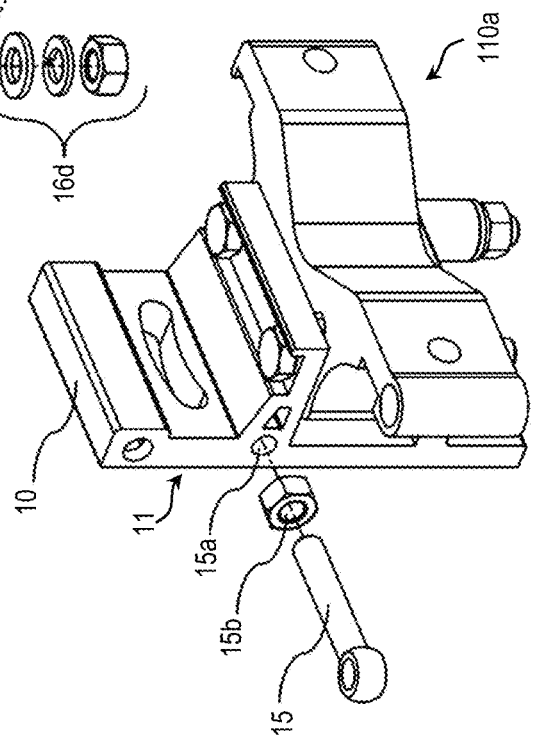

FIG. 13A, 13B detail an assembly of an adjustment mechanism that is configured to adjust a relative rotation between the pivot element 110a and the gimbal 10 according to some exemplary embodiments. An eye bolt 15 is fastened with the gimbal 10 through a threaded hole 15a of the base 11. A nut 15b locks the position of the eye bolt 15.

In some exemplary embodiments, a pin, for example azimuth pin, 17 is inserted into the hole 113 of the pivot element 110a. The pin 17 is e.g. fastened on a bottom side of the pivot element 110a with a screw 17a and washers 17b. A further eye bolt 16 is inserted through a hole 17c of the pin 17. On each side of the hole 17c of the pin 17 there may be provided one or more nuts and/or washers 16a and 16b. In some exemplary embodiments, an axis of the eye of the further eye bolt 16 is aligned with an axis of the eye 15c of the eye bolt 15, and then the eye of the further eye bolt 16 is fastened with screw 16c and nuts and washers 16d. In some exemplary embodiments, a cylinder of the eye bolts 15 and 16 are, for example fully, threaded, e.g. like a screw.

Figure 14:
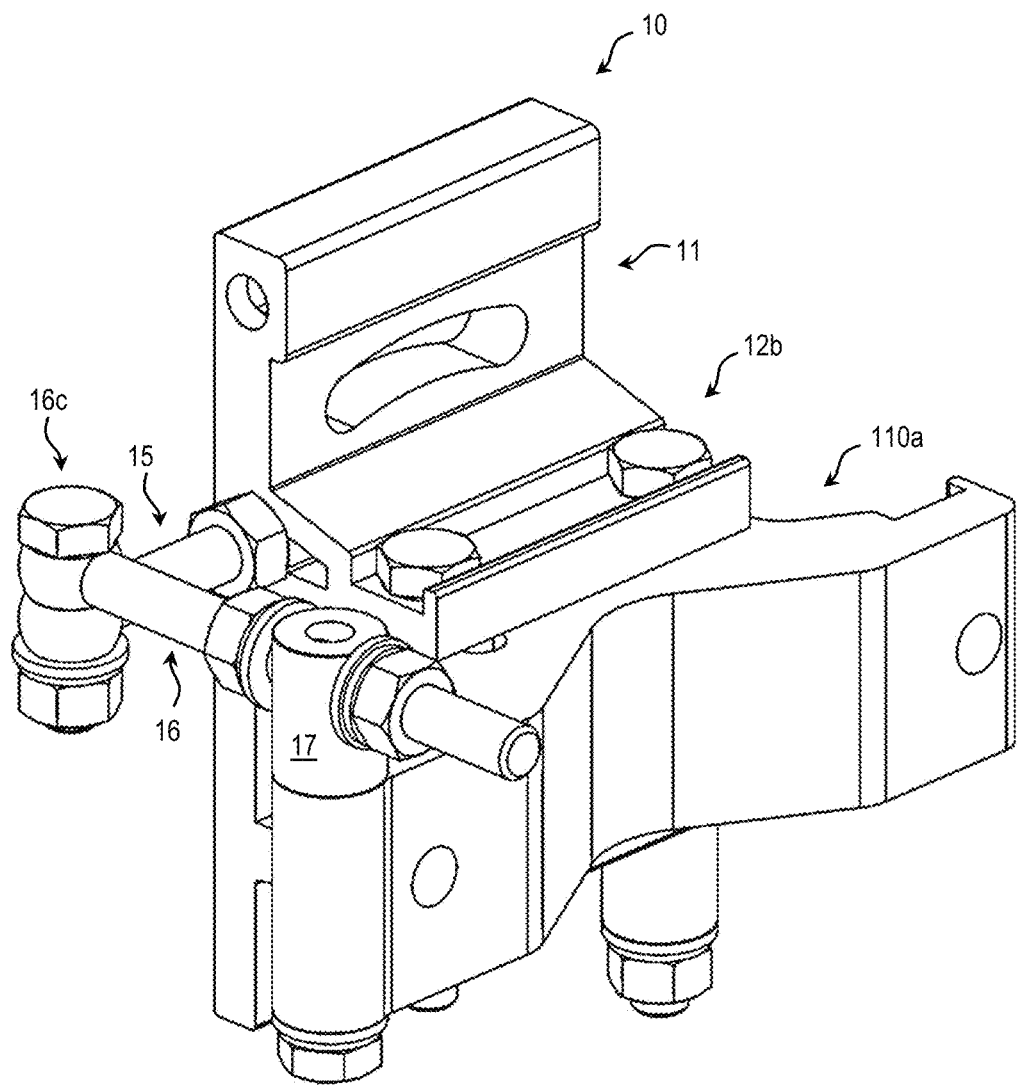

FIG. 14 schematically depicts a perspective view of the configuration according to FIG. 13A, 13B in an assembled state according to some exemplary embodiments.

Figure 15:
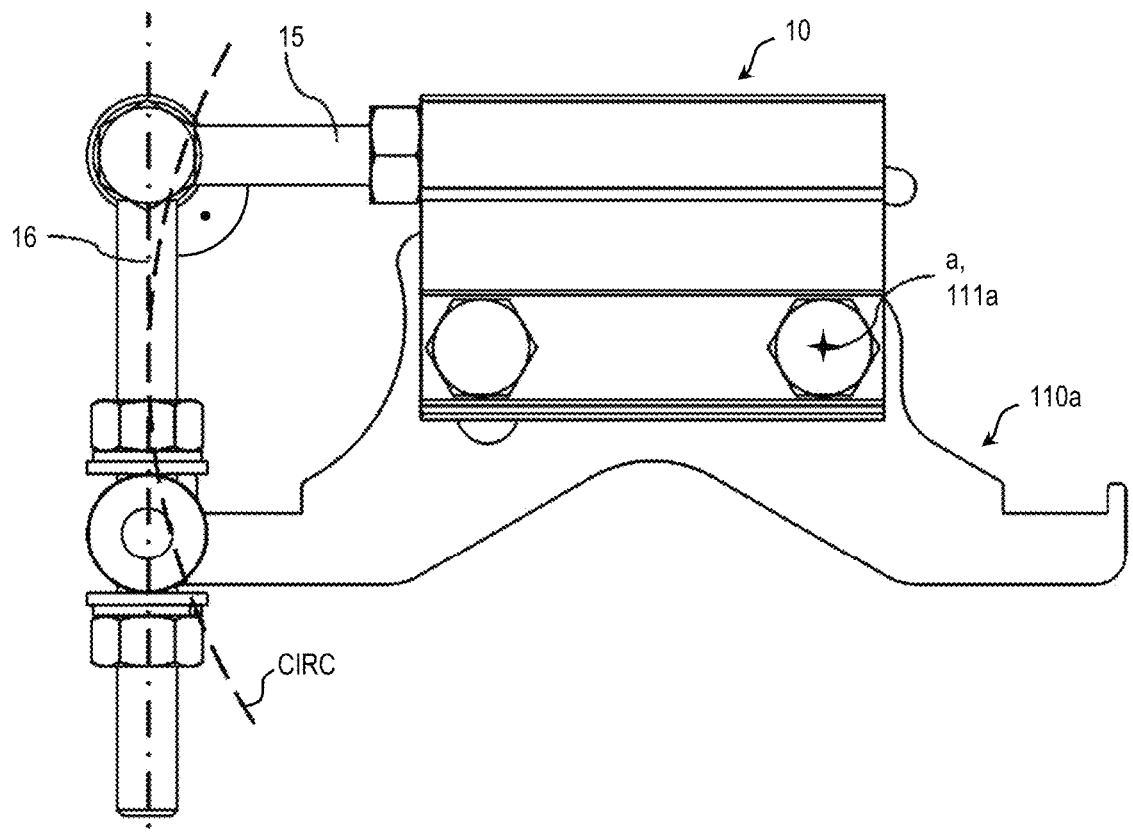

In some exemplary embodiments, FIG. 15, e.g. when an azimuth is 0 degrees (0°), the eye bolts 15, 16 are perpendicular to each other, as exemplarily depicted by FIG. 15. In that case, in some exemplary embodiments, the eye bolt 16 is tangent to a circle CIRC whose center is the axis a, also see the screw 111a.

Figure 16A:
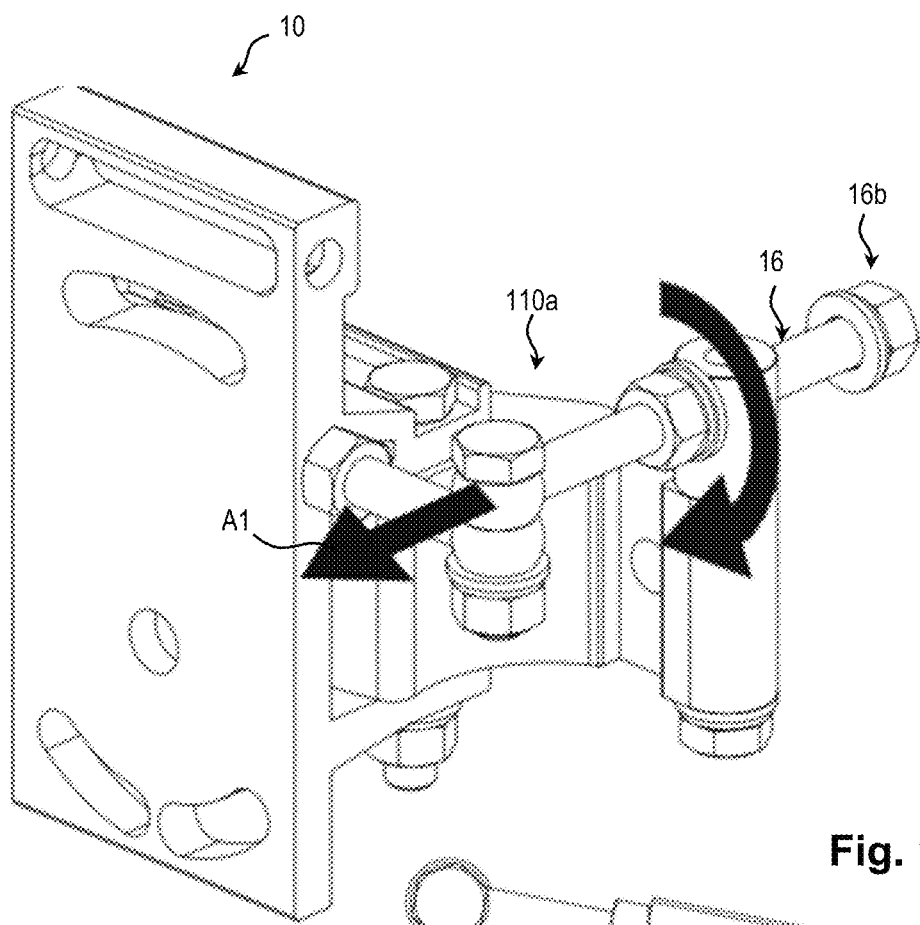
Figure 16B:
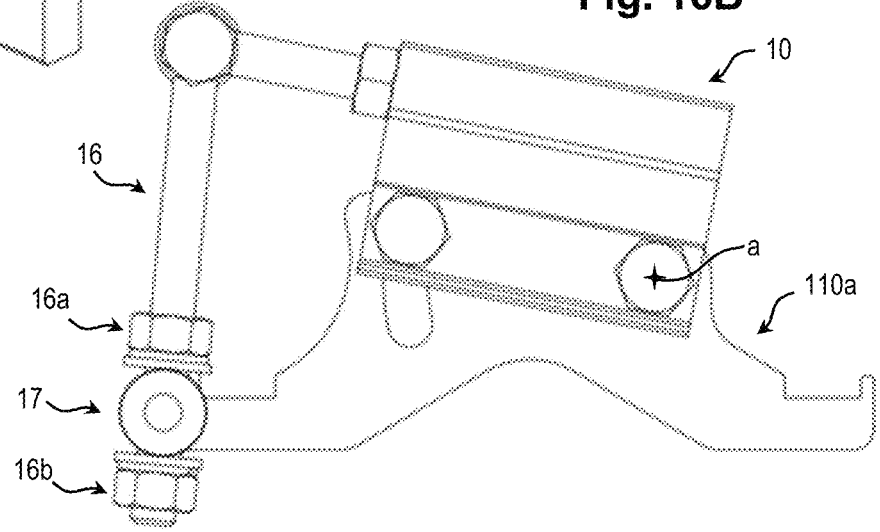

In some exemplary embodiments, see FIG. 16A, 16B, to perform an angular, e.g. azimuth, adjustment clockwise (e.g., from negative to positive azimuth), the following procedure can be used: 1) unscrew the nut 16b, 2) turn the nut 16a, so that the eye bolt 16 will push the gimbal 10 as indicated by arrow A1, which effects a rotation of the gimbal 10 around the axis a. 3) The screws 16a and 16b are tightened on the azimuth pin 17, e.g. up to a specific torque, 4) finally, the nuts 111c, 112b are tightened (ref. to FIG. 7).

Figure 17A:
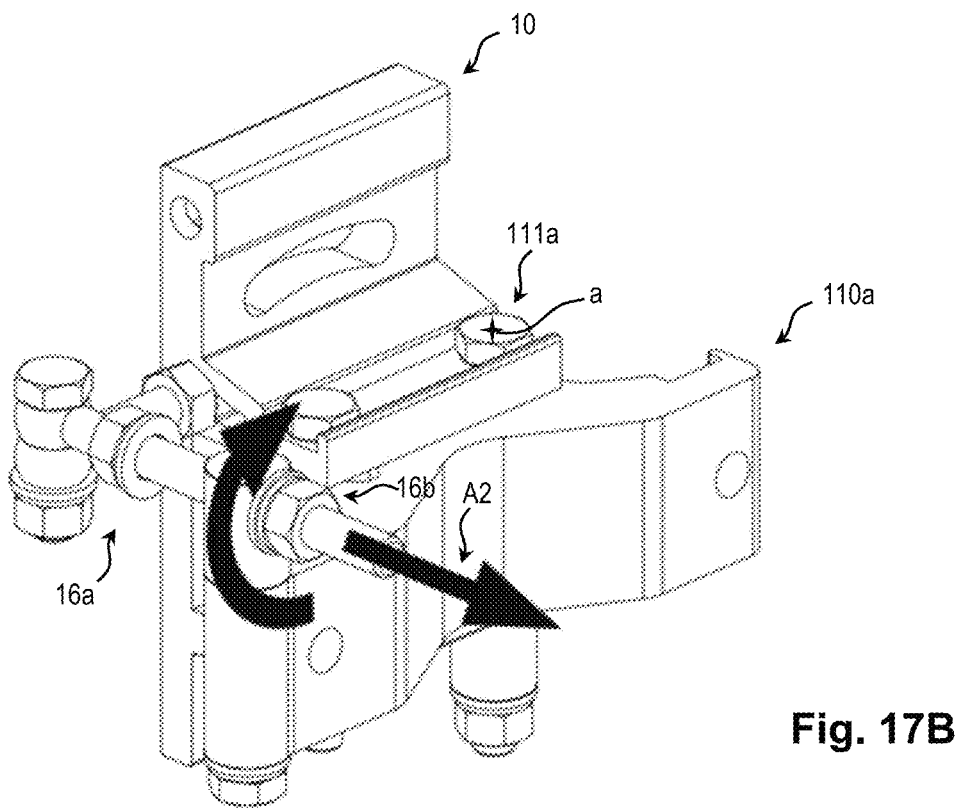
Figure 17B:
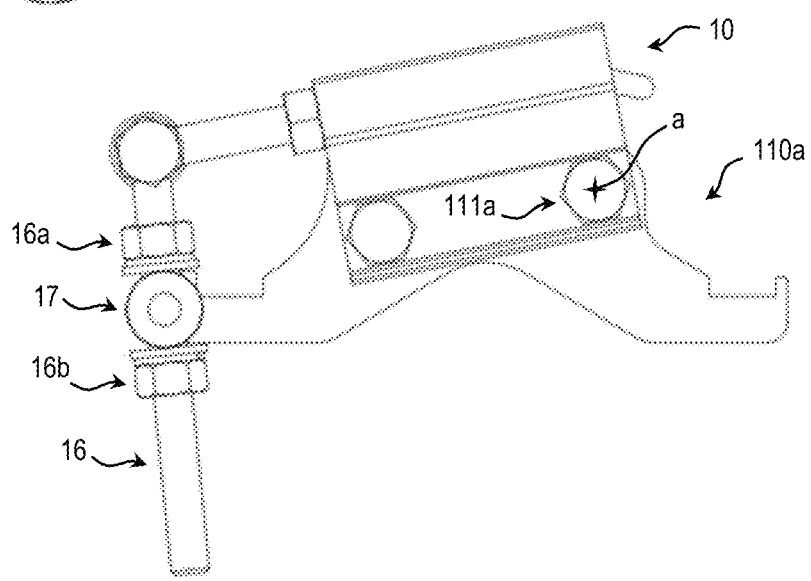

In some exemplary embodiments, see FIG. 17A, 17B, to perform an angular, e.g. azimuth, adjustment anti-clockwise (e.g., from positive to negative azimuth), the following procedure can be used: 1) unscrew the nut 16a, 2) turn the nut 16b, so that the eye bolt 16 will pull the gimbal 10 as indicated by arrow A2 in FIG. 17A, which effects a rotation of the gimbal 10 around the axis a, also see the screw 111a, 3) the screws 16a and 16b are tightened on the azimuth pin 17, e.g. up to a specific torque, 4) finally, the nuts 111c, 112b are tightened (ref. to FIG. 7).

Further exemplary embodiments, FIG. 1, relate to an antenna 20 comprising at least one of: a) an apparatus 100 according to the embodiments, b) a mounting system 1, 1a according to the embodiments. In some exemplary embodiments, the antenna 20 may comprise radio equipment, e.g. one or more OMTs and/or ODUs and/or other types of radio equipment, whereby a load on the mounting system 1, 1a is increased correspondingly. Nevertheless, the apparatus 100 according to the embodiments enables a precise rotational movement, e.g. for azimuth tuning of the antenna 20, wherein a comparatively smooth distribution of mechanical stress in the pivot element 110, 110a is attained, which reduces a wear of the components 10, 110, 110a and enables a particularly precise rotational movement and thus, for example, an efficient tuning. This way, in some exemplary embodiments, a precise alignment of, e.g. microwave, antennas 20 may be facilitated.

Figure 18:
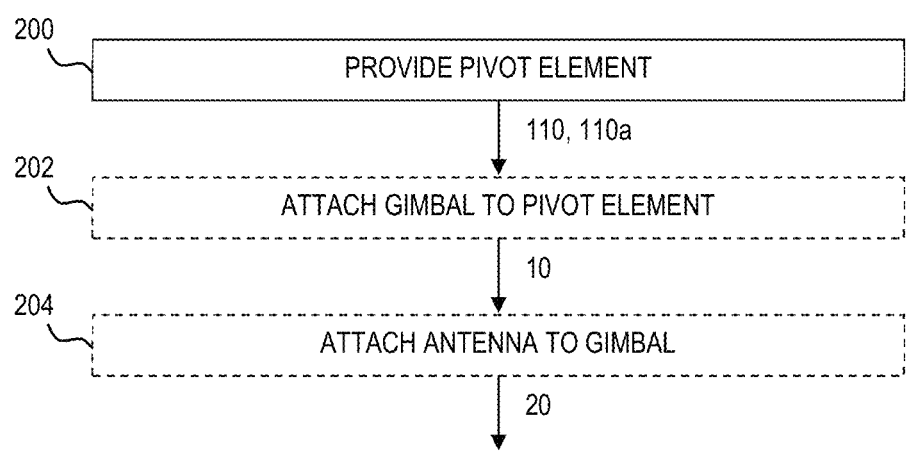

Further exemplary embodiments, FIG. 18, relate to a method of manufacturing an apparatus 100 for attaching a gimbal 10, which is configured to receive an antenna 20, to a structure S, the method comprising: providing 200 a pivot element 110, 110a for attachment to the structure S, wherein the pivot element 110, 110a comprises a first hole 111 for rotatably attaching the gimbal 10 to the pivot element 110, 110a using a first fastening element 111a, wherein the pivot element 110, 110a comprises a second hole 112, which, for example, is an oblong hole, for guiding a rotational movement of the gimbal 10 within a predetermined angular range AR around an axis a of rotation associated with the first hole 111, wherein a first surface 114 (FIG. 1, 4) of the pivot element 110, 110a, which faces the gimbal 10, for example when the gimbal 10 is attached to the pivot element 110, 110a, is convex. In some exemplary embodiments, the method comprises attaching 202 the gimbal 10 to the pivot element 110, 110a, e.g. using two fastening elements 111a, 112a, e.g. threaded bolts, optionally with washers and/or nuts, and/or screws and/or any other type of fastening element e.g. enabling to, for example releasably, attach the gimbal 10 to the pivot element 110, 110a. In some exemplary embodiments, the method comprises attaching 204 the antenna 20 to the gimbal 10. While block 204 of FIG. 18 is exemplarily provided after block 202, in some other exemplary embodiments, it is also possible to first attach the antenna 20 (optionally with one or more radio devices 22) to the gimbal 10, and then to attach the so obtained assembly 10, 20, 22 to the pivot element 110, 110a.

In some exemplary embodiments, the apparatus 100 may be used for rotatably attaching an antenna to a structure S so that the antenna 20 can be rotated with respect to the pivot element 110, 110a along an azimuth direction, e.g. in the horizontal plane.

In the following, further exemplary aspects and advantages according to some exemplary embodiments are disclosed.

In some exemplary embodiments, the apparatus 100 according to the embodiments enables to attain a comparatively small displacement between the pivot element 110, 110a and the gimbal 10, e.g. inter alia due to the convex first surface 114, which facilitates rotational movement, e.g. in the azimuth direction, even under heavy load conditions (e.g., due to heavy radio equipment 22 such as several ODUs and/or OMTs) according to some exemplary embodiments.

Similarly, in some exemplary embodiments, the behaviour of the apparatus 100 under dynamic loading (e.g., due to wind and/or external forces such as vibrations and the like), may also be improved, e.g. as compared to some conventional approaches, using the pivot element 110, 110a according to the embodiments.

In some exemplary embodiments, the configuration of the pivot element 110, 110a according to the embodiments enables to shift or distribute a mechanical stress, e.g. during azimuth adjustment, e.g. due to a weight of the radio equipment 22, to an area where the displacement between the pivot element 110, 110a and the gimbal 10 is comparatively small, e.g. the smallest. In some exemplary embodiments, shifting or distributing the mechanical stress as mentioned above can be attained by the convex shape of the first surface 114, and, optionally, by the further variants according to further exemplary embodiments exemplarily disclosed above e.g. with reference to FIG. 4.

In some exemplary embodiments, the configuration of the pivot element 110, 110a according to the embodiments enables to reduce stress concentrations of the mechanical stress, that can cause significant friction, e.g. by distributing the mechanical stress, e.g. as much as possible, on the pivot element 110, 110a. In some exemplary embodiments, e.g. to reduce the stress concentration, irregularities of the shape of at least some portions of the pivot element 110, 110a may be avoided, which, in some exemplary embodiments, can e.g. be attained by at least substantially planar surface sections 114a, 114b and/or by the radius section 114c, and/or by at least one differentiable region of the first surface 114.

In some exemplary embodiments, the configuration of the pivot element 110, 110a according to the embodiments enables to increase, e.g. maximize, a contact area between the pivot element 110, 110a and the gimbal 10, e.g. independent of a specific relative rotational (e.g., azimuth) position of these components, whereby, for example, a dynamic behaviour of the antenna 20 may also be improved (e.g., resulting in reduced displacement of the antenna 20 under influence of external forces such as e.g. wind, vibrations). As an example, the three different rotational states as depicted by FIG. 10A, 11A, 12A may be compared, from which it can be seen that whatever the (relative) angular (e.g., azimuth) position between the devices 10, 110a, the pivot element 110a remains comparatively close to the gimbal 10, i.e., in some exemplary embodiments, there is no substantial gap between both parts 10, 110a.

In some exemplary embodiments, e.g. if the length 11 (FIG. 4) of the first surface section 114a of the pivot element 110, 110a is equal to or greater than the distance d1 of the holes 13a to the first edge 12a' of the gimbal 10 and/or if the length 12 (FIG. 4) of the second surface section 114b of the pivot element 110, 110a is equal to or greater than the distance d2 of the holes 13a to the second edge 12a" of the gimbal 10, a comparative large, e.g. maximum, contact or contact area between the pivot element 110, 110a and the gimbal 10 is attained, which enables an improved stress distribution in the pivot element 110, 110a, e.g. as compared to some conventional approaches.

The invention claimed is:

1. An apparatus for attaching a gimbal for an antenna to a structure, the apparatus comprising a pivot element for attachment to the structure, wherein the pivot element comprises a first hole for rotatably attaching the gimbal to the pivot element using a first fastening element, wherein the pivot element comprises a second hole for guiding a rotational movement of the gimbal within an angular range around an axis of rotation associated with the first hole, wherein a first surface of the pivot element, which faces the gimbal when the gimbal is attached to the pivot element, includes a radius section that is convex, a second surface of the pivot element opposite the first surface is configured to receive the structure, the second surface defining a concave region, and the first hole, the radius section, and the concave region are aligned in a first direction.

2. The apparatus according to claim 1, wherein the first surface of the pivot element comprises a first surface section and a second surface section.

3. The apparatus according to claim 2, wherein the first surface section and the second surface section include a first angle, which is less than 180 degrees.

4. The apparatus according to claim 2, wherein the radius section is between the first surface section and the second surface section.

5. The apparatus according to claim 4, wherein a center of the radius section is associated with the axis of rotation, and the center of the radius section is at least approximately the axis of rotation.

6. The apparatus according to claim 1, wherein the first surface of the pivot element is differentiable in shape such that the first surface of the pivot element is configured to enable at least one of a smooth distribution of forces or a smooth distribution of mechanical stress applied to the pivot element when the gimbal is attached to the pivot element.

7. The apparatus according to claim 2, wherein the first surface of the pivot element is differentiable in shape at least in a region around the first surface section and the second surface section.

8. The apparatus according to claim 1, wherein the second hole is arranged partly around the first hole, and a center of a radius of the second hole is at least approximately the axis of rotation.

9. The apparatus according to claim 1, wherein the pivot element comprises a cylindrical shape, and the first surface of the pivot element forms a part of a cylindrical surface of the cylindrical shape.

10. The apparatus according to claim 1, wherein the pivot element comprises at least one opening between the first hole and the second hole.

11. The apparatus according to claim 1, wherein the pivot element comprises a third hole for attaching a component of an adjustment mechanism that is configured to adjust a relative rotation between the pivot element and the gimbal.

12. The apparatus according to claim 1, comprising at least one of: a) the first fastening element, or b) a second fastening element for connecting the gimbal to the pivot element through the second hole.

13. A mounting system for attaching an antenna to a structure, the mounting system comprising the apparatus according to claim 1 and the gimbal is rotatably attachable and/or rotatably attached to the pivot element of the apparatus.

14. The mounting system according to claim 13, wherein the gimbal comprises at least a first mounting element comprising a first hole and a second hole for attachment to the pivot element, the first surface of the pivot element includes a first surface section and a second surface section, and a width of the first mounting element is equal to or smaller than a sum of a length of the first surface section of the pivot element and a length of the second surface section of the pivot element.

15. An antenna comprising at least one of: a) the apparatus according to claim 1, or b) a mounting system including the gimbal that is rotatably attachable and/or rotatably attached to the pivot element of the apparatus according to claim 1.

16. The apparatus according to claim 3, wherein the first angle ranges between 150 degrees and 178 degrees.

* * * * *